United States Patent
Schörghuber et al.

(10) Patent No.: US 8,129,660 B2
(45) Date of Patent: Mar. 6, 2012

(54) BUFFER DEVICE FOR A WELDING WIRE AND WELDING UNIT

(75) Inventors: Manfred Schörghuber, Wels (AT); Bernhard Haidinger, Wels-Thalheim (AT)

(73) Assignee: Fronius International GmbH, Pettenbach (AT)

( * ) Notice: Subject to any disclaimer, the term of this patent is extended or adjusted under 35 U.S.C. 154(b) by 899 days.

(21) Appl. No.: 10/551,945

(22) PCT Filed: May 11, 2004

(86) PCT No.: PCT/AT2004/000164
§ 371 (c)(1),
(2), (4) Date: Oct. 5, 2005

(87) PCT Pub. No.: WO2004/105992
PCT Pub. Date: Dec. 9, 2004

(65) Prior Publication Data
US 2007/0164074 A1    Jul. 19, 2007

(30) Foreign Application Priority Data
May 28, 2003   (AT) ................. A 830/2003

(51) Int. Cl.
*B23K 9/12* (2006.01)
*B23K 9/28* (2006.01)
*B23K 9/32* (2006.01)
*B23K 9/10* (2006.01)

(52) U.S. Cl. ............... 219/137.7; 219/137.2; 219/137.9; 219/137.71

(58) Field of Classification Search ........... 219/137.2–9, 219/137.31, 137.41–44, 137.51–52, 138, 219/137.63; 226/108
See application file for complete search history.

(56) References Cited

U.S. PATENT DOCUMENTS

| | | | | |
|---|---|---|---|---|
| 2,790,925 A * | 4/1957 | Landis et al. | .................. | 314/69 |
| 2,964,612 A * | 12/1960 | Savard et al. | ............ | 219/145.32 |
| 3,384,778 A * | 5/1968 | Jeannette | .................. | 219/137.7 |
| 3,630,425 A * | 12/1971 | Wilkens | ......................... | 226/108 |
| 3,901,425 A * | 8/1975 | Taylor et al. | .................. | 226/108 |
| 4,102,483 A * | 7/1978 | Ueyama et al. | ............... | 228/244 |
| 4,187,411 A * | 2/1980 | Bryce et al. | ................. | 219/137.2 |
| 4,261,500 A | 4/1981 | Samokovliski et al. | | |

(Continued)

FOREIGN PATENT DOCUMENTS
DE    38 27 508    2/1990
(Continued)

*Primary Examiner* — Henry Yuen
*Assistant Examiner* — Hung D Nguyen
(74) *Attorney, Agent, or Firm* — Collard & Roe, P.C.

(57) ABSTRACT

The invention relates to a device for buffering a welding wire, whereby a wire buffer, in particular a wire buffer magazine is arranged between a wire advance device and a further wire advance device which is preferably arranged in the vicinity of a welding torch, or in the welding torch and the welding wire is run between the two wire advance devices in a wire core. According to the invention, a simple and compact a buffer device as possible and an improvement in the dynamic behaviour of the wire supply can be achieved, whereby the wire core is attached or fixed at one end and the other end thereof is free to move and the wire core with the welding wire is arranged such as to be free to move within a wire guide tube with a substantially larger cross-section than the outer diameter of the wire core and the buffer volume of the wire buffer magazine is defined by the cross-section and the length of the substantially larger wire guide tube.

15 Claims, 10 Drawing Sheets

U.S. PATENT DOCUMENTS

| | | | |
|---|---|---|---|
| 4,458,719 A * | 7/1984 | Strybel | 137/614.03 |
| 4,731,518 A * | 3/1988 | Parmelee et al. | 219/137.31 |
| 6,200,519 B1 * | 3/2001 | Wimroither | 266/66 |
| 7,165,707 B2 * | 1/2007 | Huismann et al. | 226/111 |
| 2005/0150883 A1 * | 7/2005 | Tomiyasu et al. | 219/137.9 |

FOREIGN PATENT DOCUMENTS

| | | |
|---|---|---|
| DE | 43 20 405 | 12/1994 |
| DE | 197 32 379 | 2/1999 |
| DE | 197 38 785 | 4/1999 |
| DE | 101 00 164 | 8/2001 |
| EP | 1 384 548 | 1/2004 |
| GB | 1 463 004 | 2/1977 |
| JP | 8-309536 | 11/1996 |
| JP | 09001332 | 1/1997 |
| WO | WO 02/090034 | 11/2002 |

* cited by examiner

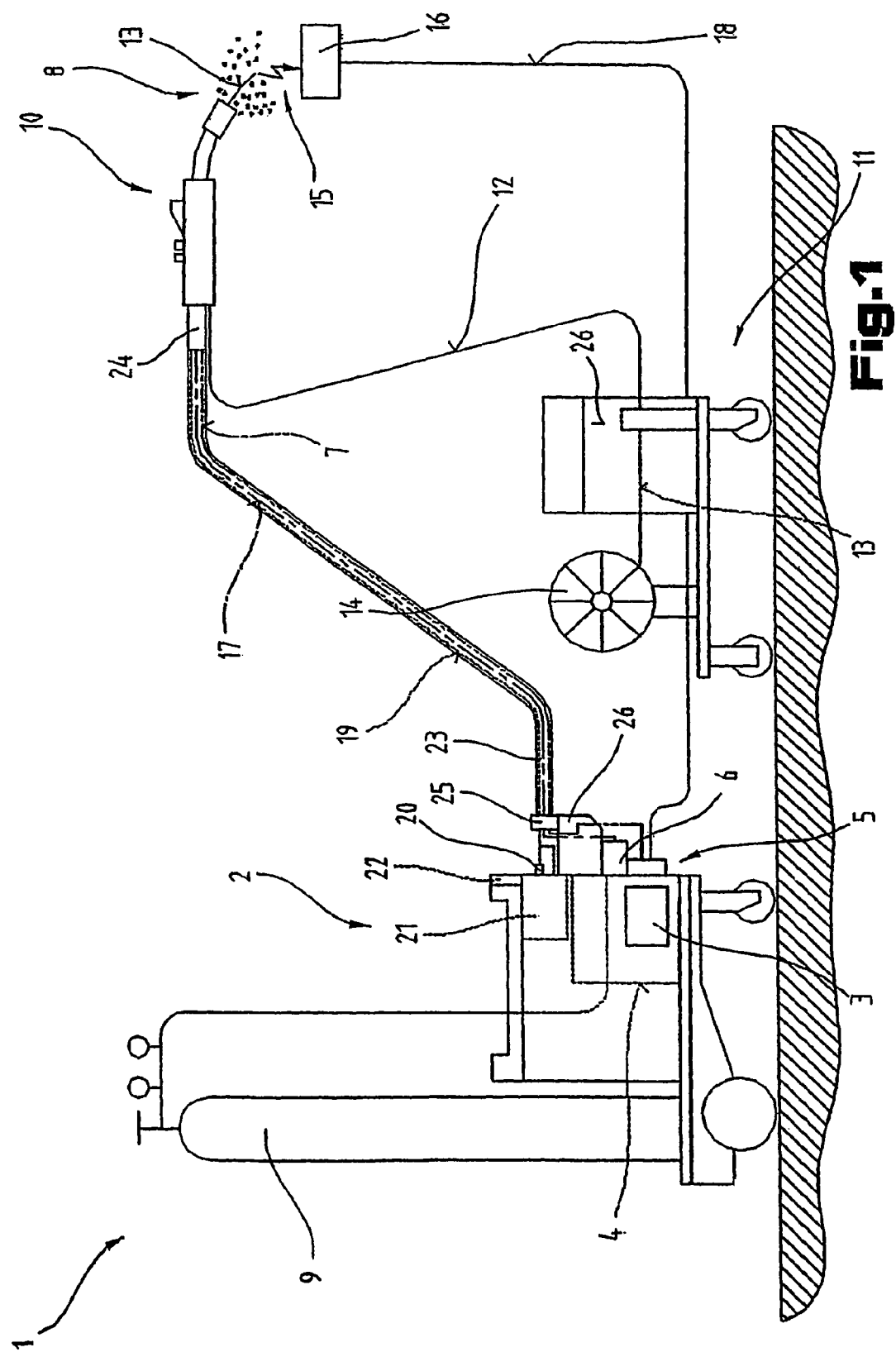

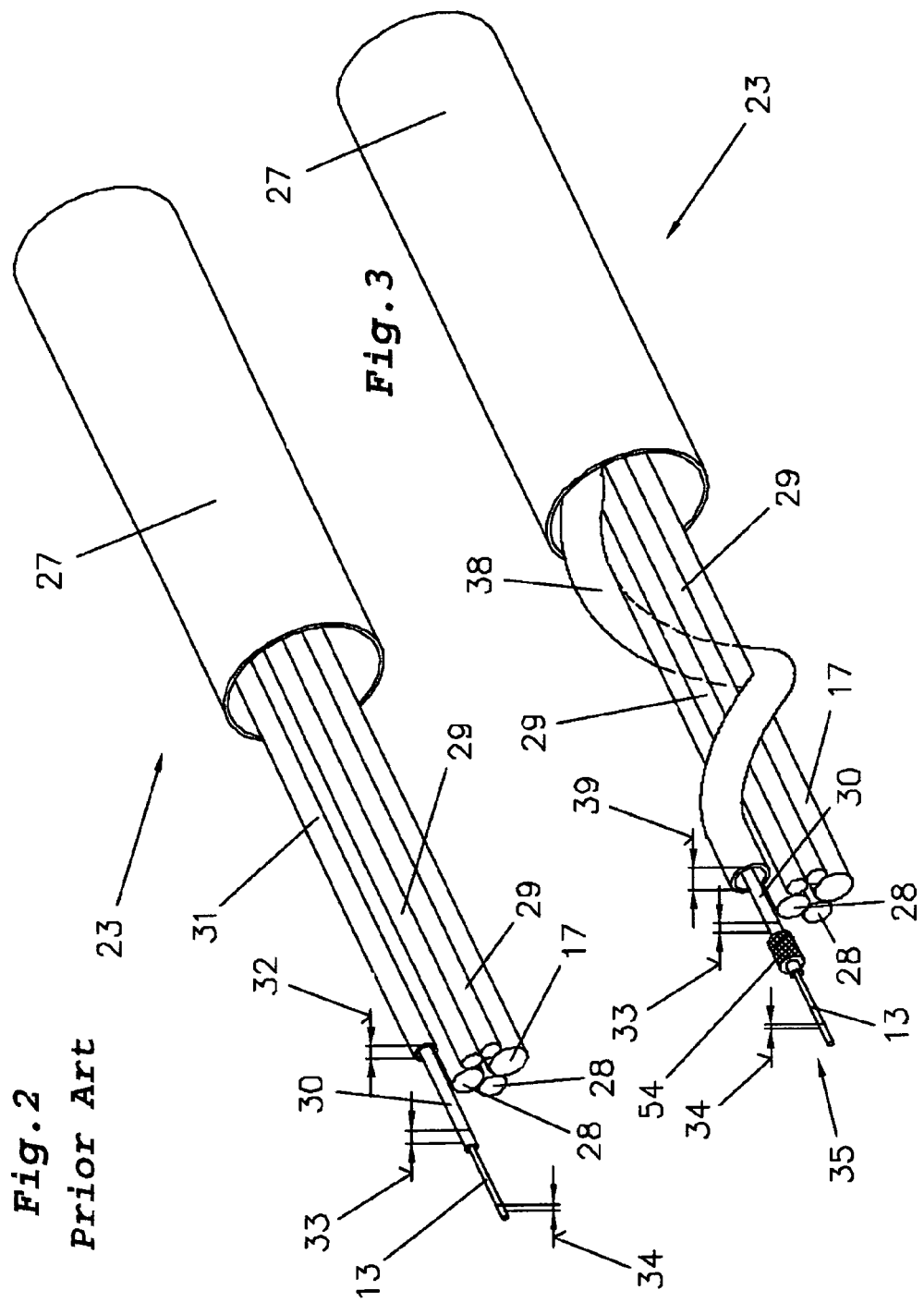

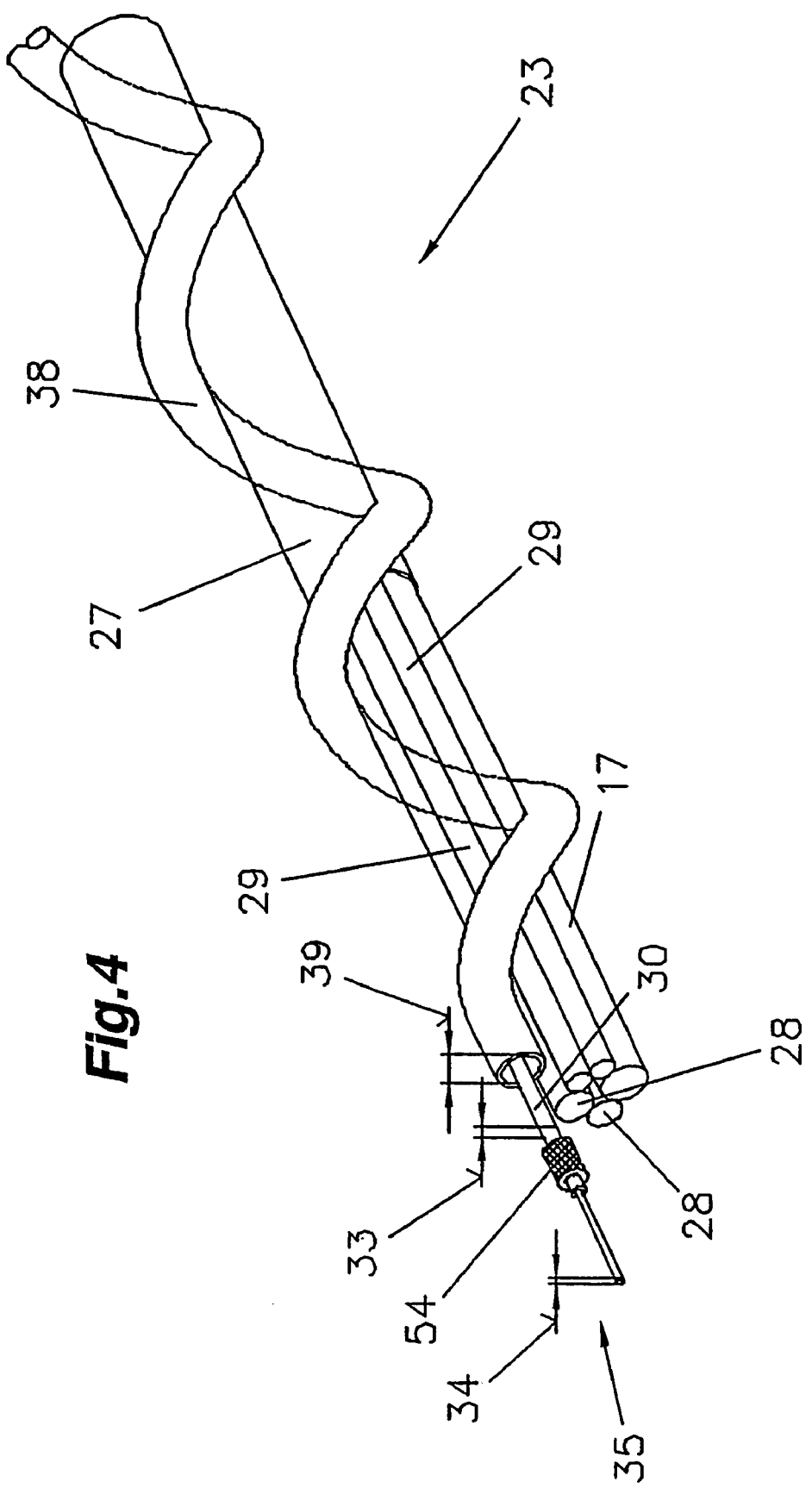

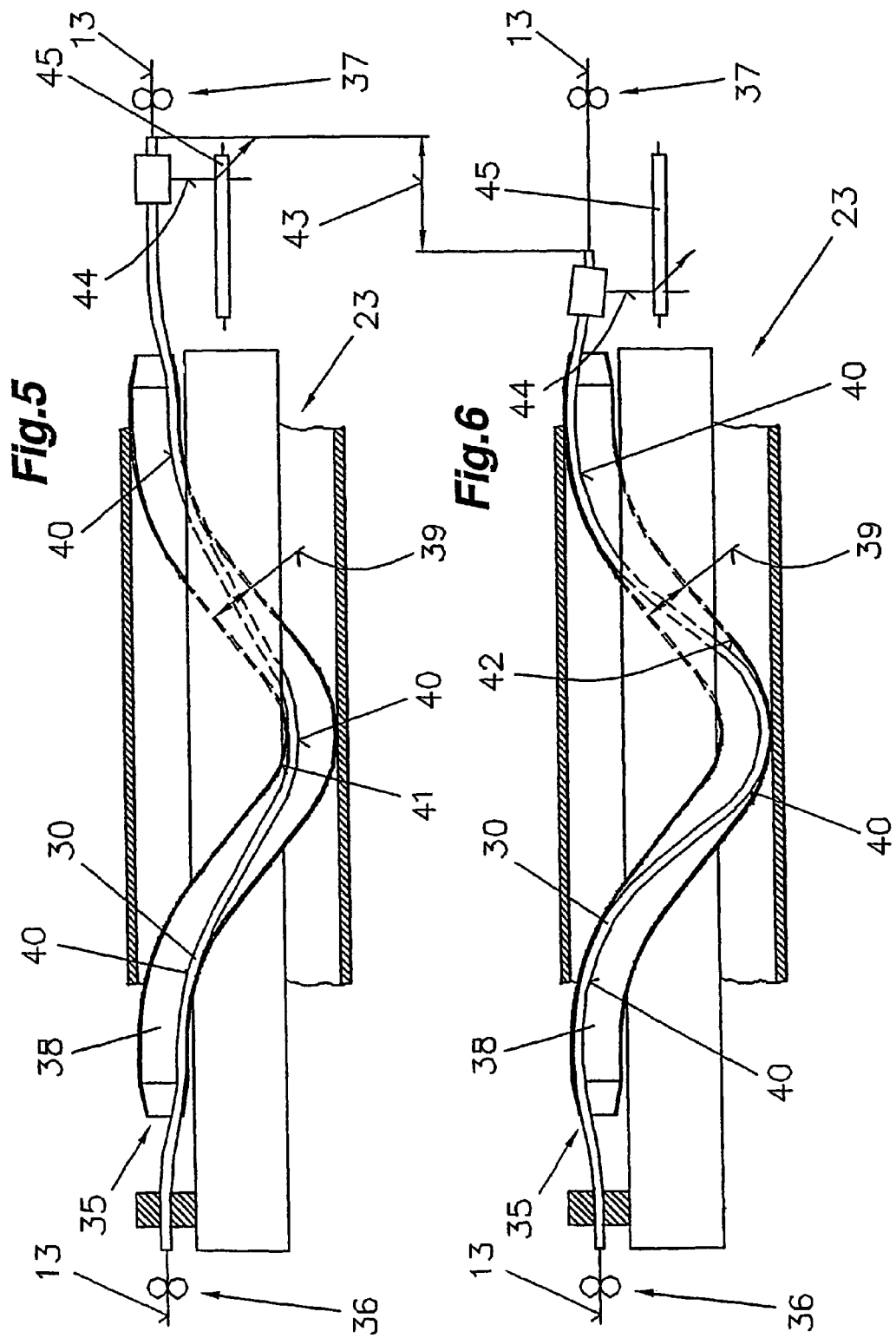

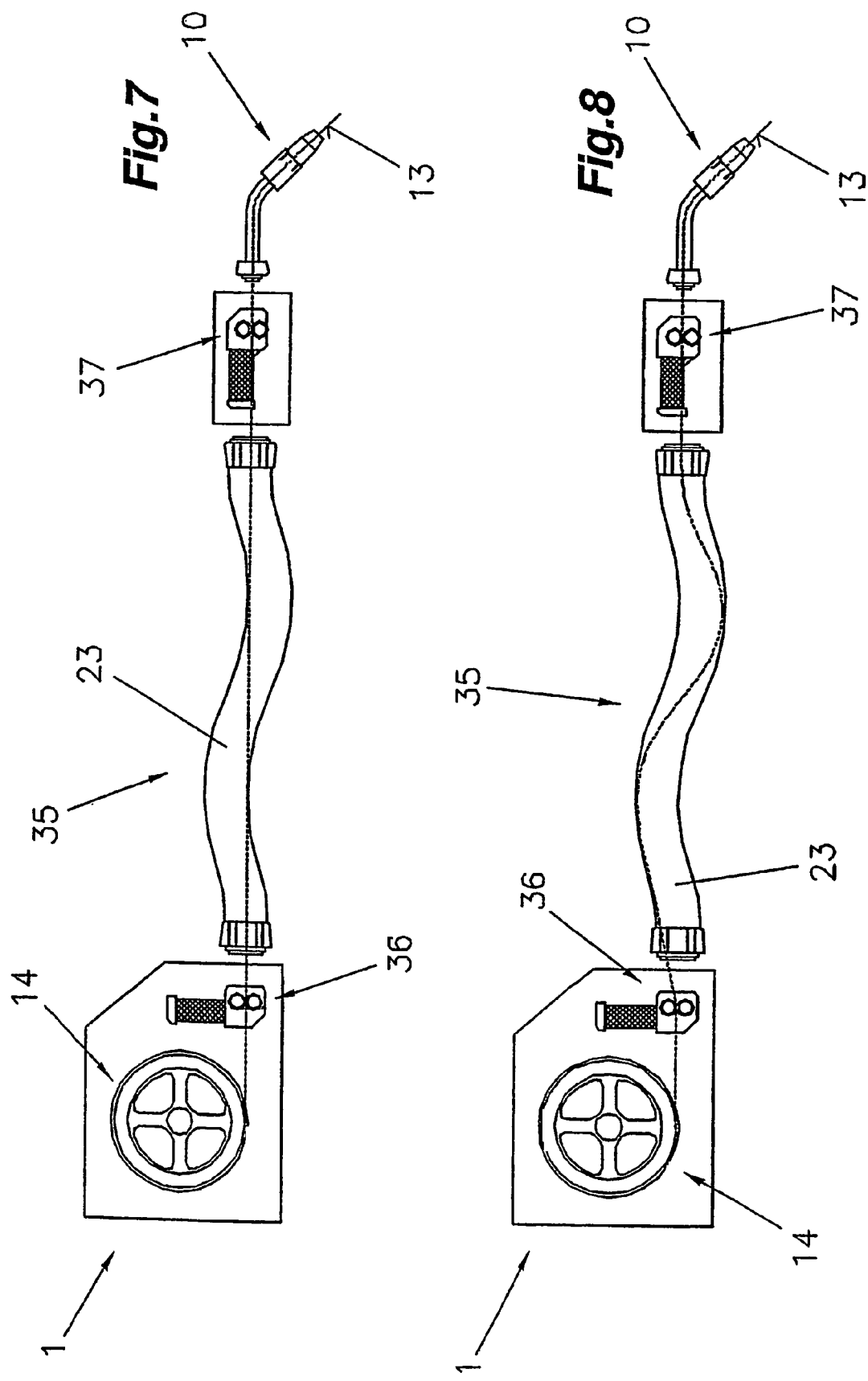

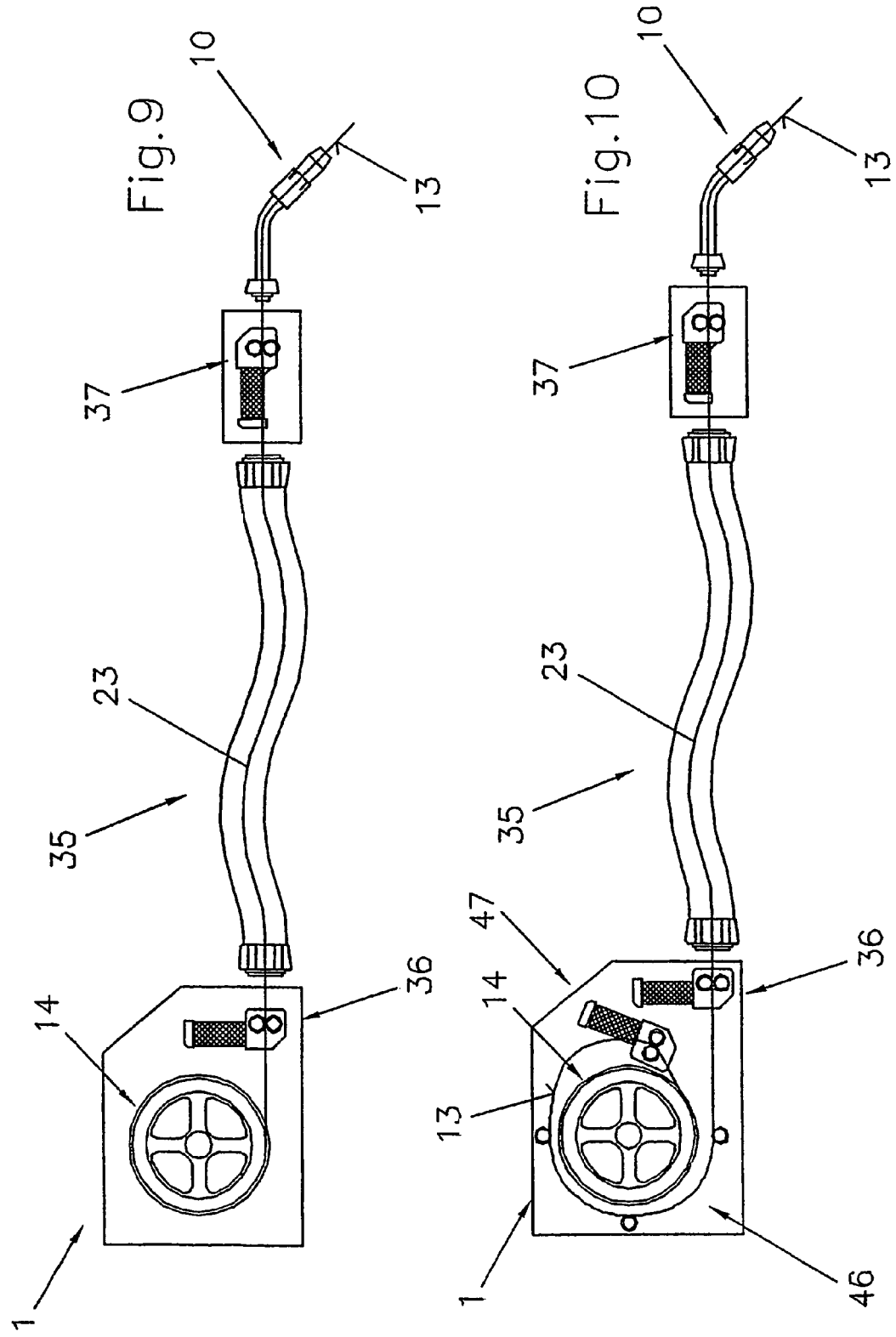

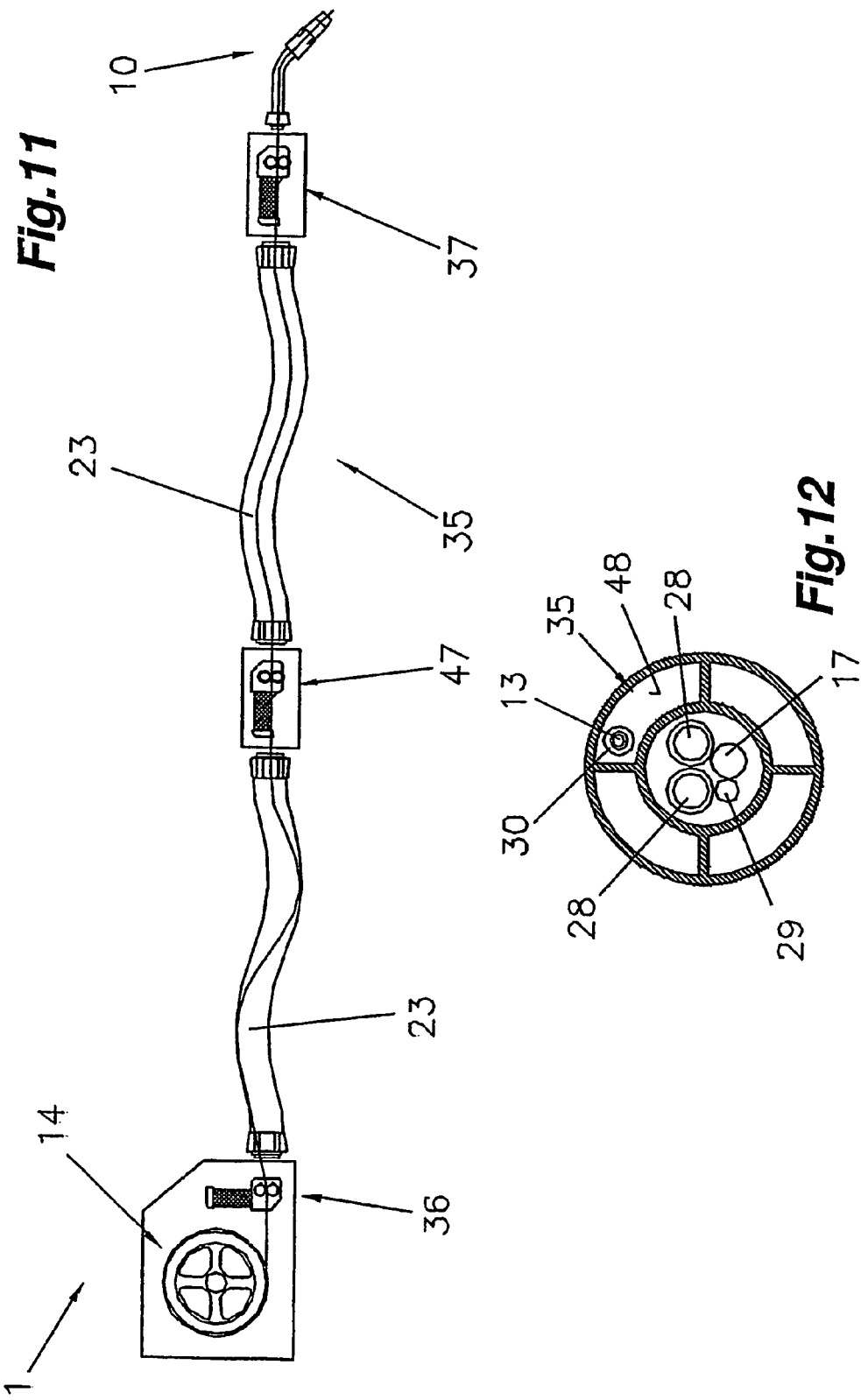

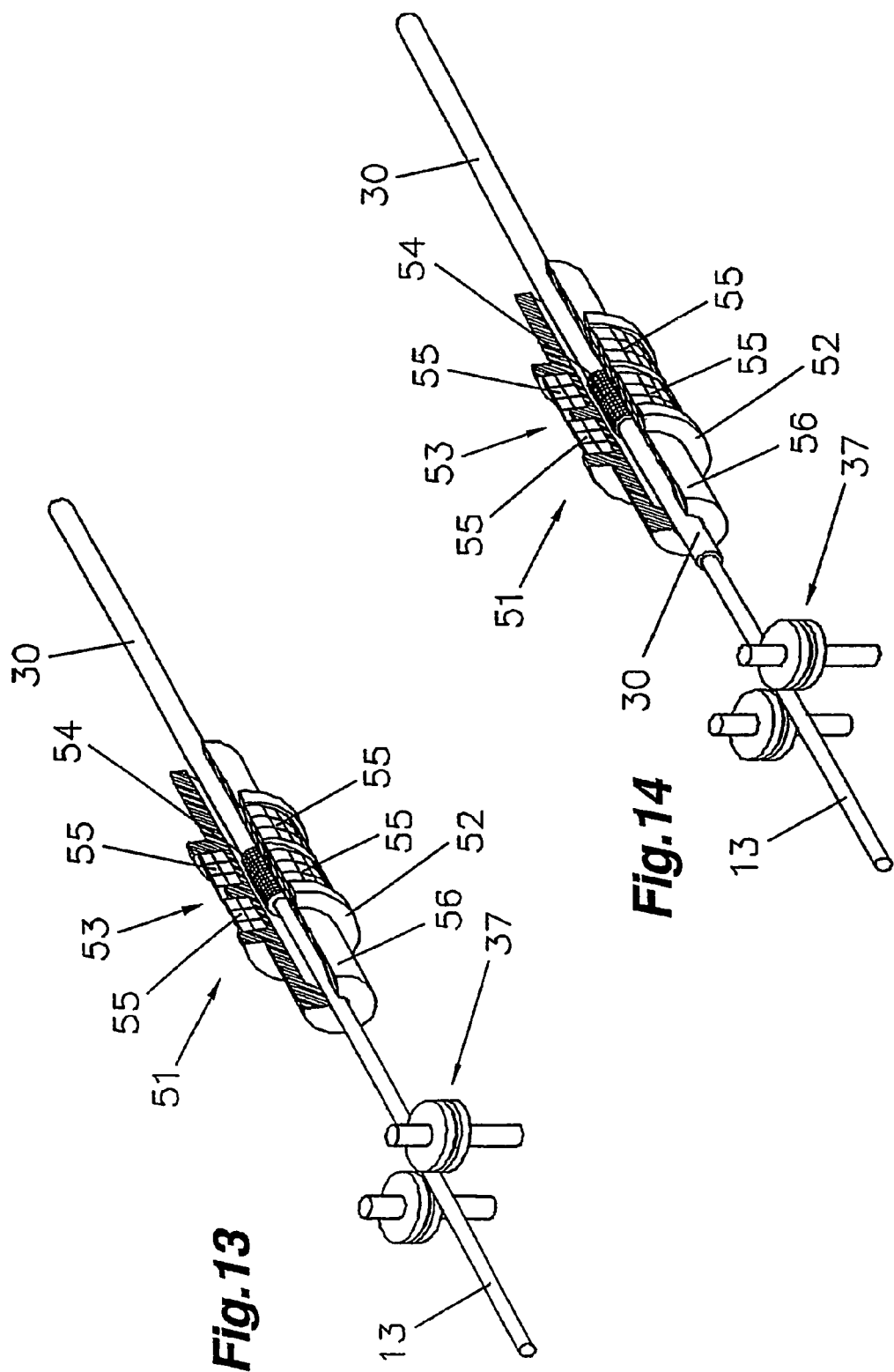

BUFFER DEVICE FOR A WELDING WIRE AND WELDING UNIT

CROSS REFERENCE TO RELATED APPLICATIONS

Applicants claim priority under 35 U.S.C. §119 of AUSTRIAN Application No. A 830/2003 filed on May 28, 2003. Applicants also claim priority under 35 U.S.C. §365 of PCT/AT2004/000164 filed on May 11, 2004. The international application under PCT article 21(2) was not published in English.

The invention relates to a buffer device for a welding wire, wherein a wire buffer, in particular a wire buffer storage, is arranged between a wire feeder provided on the welding apparatus, or an external wire feeding means, and a further wire feeder preferably arranged in the region of a welding torch, or within the welding torch, and the welding wire is conducted between the two wire feeders within a wire core.

The invention further relates to a welding plant including a welding apparatus, a hose package and a welding torch, wherein the hose package connects the welding torch with the welding apparatus, as well as a device designed as a wire buffer storage and arranged between two wire feeders.

Most recent welding techniques, in which the welding wire is no longer conveyed only at constant speed in one direction but forward and backward movements or different conveying speeds are applied at the ignition and/or during the welding process, great emphasis is placed on wire conveyance. On account of different wire speeds and/or conveying directions of the welding wire, current wire conveying systems involve the problem of the welding wire conveyance response behavior being very sluggish, thus preventing the achievement of optimum welding results. The welding wire must, for instance, be pushed back over the entire hose package at a reversal of the running direction, i.e., from a forward movement to a backward movement, whereby a highly sluggish response behavior is, however, generated due to the slack of the welding wire and wire advance.

With such welding wire conveyances applying different wire speeds and/or different conveying directions, wire buffers or wire buffer storages are used to collect surplus welding wire, since in most cases only one of usually two wire feeders carries out a reversal of direction.

From DE 197 38 785 C2, for instance, a device for electric-arc welding using a consumable electrode is known, in which the welding wire is supplied from a feed drum to the welding site via two wire feeders. In that context, a short-circuit welding process is described, in which the welding wire conveyance prior to the completion of the droplet formation carries out a droplet-transfer-supporting movement, which means that the welding wire is pulled back by the wire feeder at the occurrence of a short-circuit and subsequently is again moved forwards after having reached a predetermined distance, the welding wire being transported in a wire buffer. However, the configuration of the wire buffer cannot be taken from that document.

From DE 38 27 508 A1, a transport device is known, by which the welding wire is conveyed with a constant force even at unfavorable force introductions, while avoiding tensile and compressive stresses. The welding wire is conducted through an evading part and a curved hose between a pusher drive arranged within the welding apparatus or a wire feeder, and a tractive drive preferably arranged in the region of the welding torch or within the welding torch itself. The hose strain is supported by a spring. The evadable part is coupled to a control organ measuring the evasion path of the evading part at the occurrence of compressive or tensile stresses on the welding wire, and a control system for compensation via a speed regulation of the first drive. In that solution, the welding wire is unwound from the feed drum via the first drive and introduced into a hose or hollow wire core. The hollow wire core subsequently is arranged to lay bare, forming the wire buffer storage in the form of a loop in that bare region with the loop being able to deform in that bare region, which means that the loop is enlarged or reduced, thus enabling more or less welding wire to be taken up. After this, the hose or hollow wire core is introduced into the hose package, extending as far as to the further, tractive drive, which is preferably arranged in the region of the welding torch or within the welding torch itself.

Another wire puffer configuration is known from DE 43 20 405 C2, which describes a device for the slip-free conveyance of a welding wire. There, a wire buffer storage or wire buffer is again formed between two wire feeders, at which the welding wire forms a complete wire loop before being introduced into the hose package. The wire buffer storage is, thus, formed by a loop between two spaced-apart plates whose mutual distance is larger than the diameter of the welding wire. A sensor detecting the diameter of the loop of the welding wire is arranged to monitor the amount of welding wire present in the wire buffer.

A wire buffer storage of another kind, by which a deflection of the welding wire is realized via deflection pulleys, is known from DE 101 00 164 A1. There, the wire buffer storage is arranged between the feed drum and a wire feeder, wherein the welding wire, following the wire feeder, is again introduced into a hollow wire core extending within a hose package as far as to a further wire feeder, or the welding torch.

The above-described systems involve the disadvantage of requiring huge space for that kind of wire buffer or wire buffer storage, thus enabling its efficient application only in the region of the welding apparatus or wire feeder, or as a separate device. It is, thus, necessary to convey the welding wire from the wire buffer over the entire hose package to the welding torch, thus causing large friction losses and hardly improving the wire conveyance response behavior. Such friction losses and the great sluggishness of the wire conveyance occur because with known wire conveying means the welding wire runs in a hollow wire core which is inserted in a guide tube, preferably in the hose package, with the inner diameter of the guide tube being only negligibly larger than an outer diameter of the wire core. The precise guidance of the wire core is thereby ensured, yet it is necessary for the welding wire, for instance at a reversal of the direction of conveyance, to be pushed back into the wire buffer storage over the entire length of the wire core, i.e., the hose package.

The present invention is, therefore, based on the object to provide a buffer device for a welding wire, which is constructed in a very simple and compact manner. Another object resides in making the wire electrode available in a force-free manner to a wire feeder arranged substantially in the region of the welding torch. A further object of the present invention also consists in improving the dynamic behavior of the wire conveyance.

Another object of the invention consists in providing a welding plant of the described kind, which comprises as simple and compact a structure as possible and by which the dynamic behavior of the conveyance of the welding wire is enhanced.

The objects of the invention are achieved in that the wire buffer storage is designed in a manner that the wire core is fastened or fixed on one end, with its other end being freely movable, and that the wire core together with the welding wire, at least over a partial region, is arranged to be freely movable within a wire guide hose having a substantially larger cross section or inner diameter than the cross section or outer diameter of the wire core, and that the storage volume of the wire buffer storage is defined by the cross section and length of the substantially larger wire guide hose.

In an advantageous manner, it is thereby achieved that the wire guide hose serves as a wire buffer storage, since the wire core is able to move freely, that is to say evade, within the substantially larger wire guide hose and, hence, take up the surplus welding wire, for instance at a backward conveyance. It is, thus, no longer required to push the welding wire back over the entire wire core, but that the welding wire and the wire core are freely movable in the wire guide hose so as to enable surplus welding wire to be taken up for compensation. It is thereby ensured that no displacement of the welding wire through the wire core in the wire buffer storage need be effected by the wire feeder in the region of the welding torch at a backward movement of the welding wire, but the wire core is deformed directly in the wire guide hose and surplus wire will, hence, be taken up by such deformation, whereas the welding wire in the prior art, at first, has to be pushed back through the wire core in the hose package, since no or only a minimum evasion of the wire core is feasible in the wire guide hose before a deformation of the wire core may take place in the bare region of the wire core and surplus welding wire will be taken up. Another very essential advantage resides in that the wire buffer storage is now arranged directly in the region of the further wire feeder, or welding torch, i.e., behind the wire feeder, or welding torch, so that the welding wire need no longer be pushed back over the hose package. The response behavior during a change of the conveying direction of the welding wire is thereby substantially improved, enabling a very rapid reversal of direction. Friction losses are also strongly minimized, since the wire core with the welding wire is able to move within the wire buffer storage and no movement, particularly backward movement, will occur any longer in the wire core during the backward conveyance of the welding wire. Another advantage also resides in that, due to the wire buffer storage being formed directly behind the welding torch, the wire feeder and the drive motor can be dimensioned very small, since the latter need not overcome any frictional forces during the wire transport and a very small and light drive motor can, thus, be used, thus minimizing the structural sizes of the welding torch and the driving element at the welding torch. The accessibility in automatic welding plants is, thus, substantially enhanced.

A configuration according to claims 2 and 3 is, however, also advantageous, because this will enable an evasion of the wire core in the enlarged wire guide hose. It is, thus, advantageously ensured that the wire buffer is realized in a simple manner over the length of the enlarged wire guide hose, thus providing a very large wire buffer storage having small spatial dimensions.

The configuration according to claims 4 to 6 is advantageous too, because it enables the subsequent installation of a wire buffer storage of this type in existing plants by simply exchanging the hose package. No conversions or additional appliances forming the wire buffer storage need, thus, be realized in existing plants, as is the case in prior art facilities.

The configuration according to claims 7 to 9 in an advantageous manner enables a wire conveyance independent of the hose package, wherein the wire buffer storage is again formed by the wire guide hose.

Another advantage of the configurations according to claims 5 and 9 resides in that, due to the special arrangement, i.e. helix-shaped or spiral arrangement, of the wire guide hose, the length of the wire guide hose is enlarged in a manner that the wire buffer contents, i.e., the storage volume for the reception of surplus welding wire will be substantially enlarged.

The configuration according to claim 10 is advantageous too, because it readily enables the evaluation of the filling level of the wire buffer, or amount of welding wire stored in the wire buffer.

A configuration according to one or several of claims 11 to 14 is also of advantage, since it enables a very rapid exchange of the wire guide hose, thus keeping the downtime of the plant, during which no welding is feasible, very short.

The object of the invention is further achieved by a welding plant of the defined kind, in which the device designed as a wire buffer storage is formed in or around the hose package. In this respect, it is advantageous that very high dynamics during the conveyance of the welding wire at different wire transport speeds or at a forward/backward movement will be achieved during a welding process.

The present invention will be explained in more detail by way of the attached drawings describing exemplary embodiments of the wire buffer storage.

Therein:

FIG. 1 is a schematic illustration of a welding machine or welding apparatus;

FIG. 2 is a schematic illustration of a hose package as is used in the prior art;

FIG. 3 is a schematic illustration of a novel hose package including a helix-shaped wire guide hose;

FIG. 4 shows a hose package with an externally arranged helix-shaped wire guide hose;

FIG. 5 is a schematic illustration of the storage principle of a wire buffer storage with a minimum storage volume;

FIG. 6 is a further schematic illustration of the storage principle according to FIG. 5 with a maximum storage volume;

Figure 15:
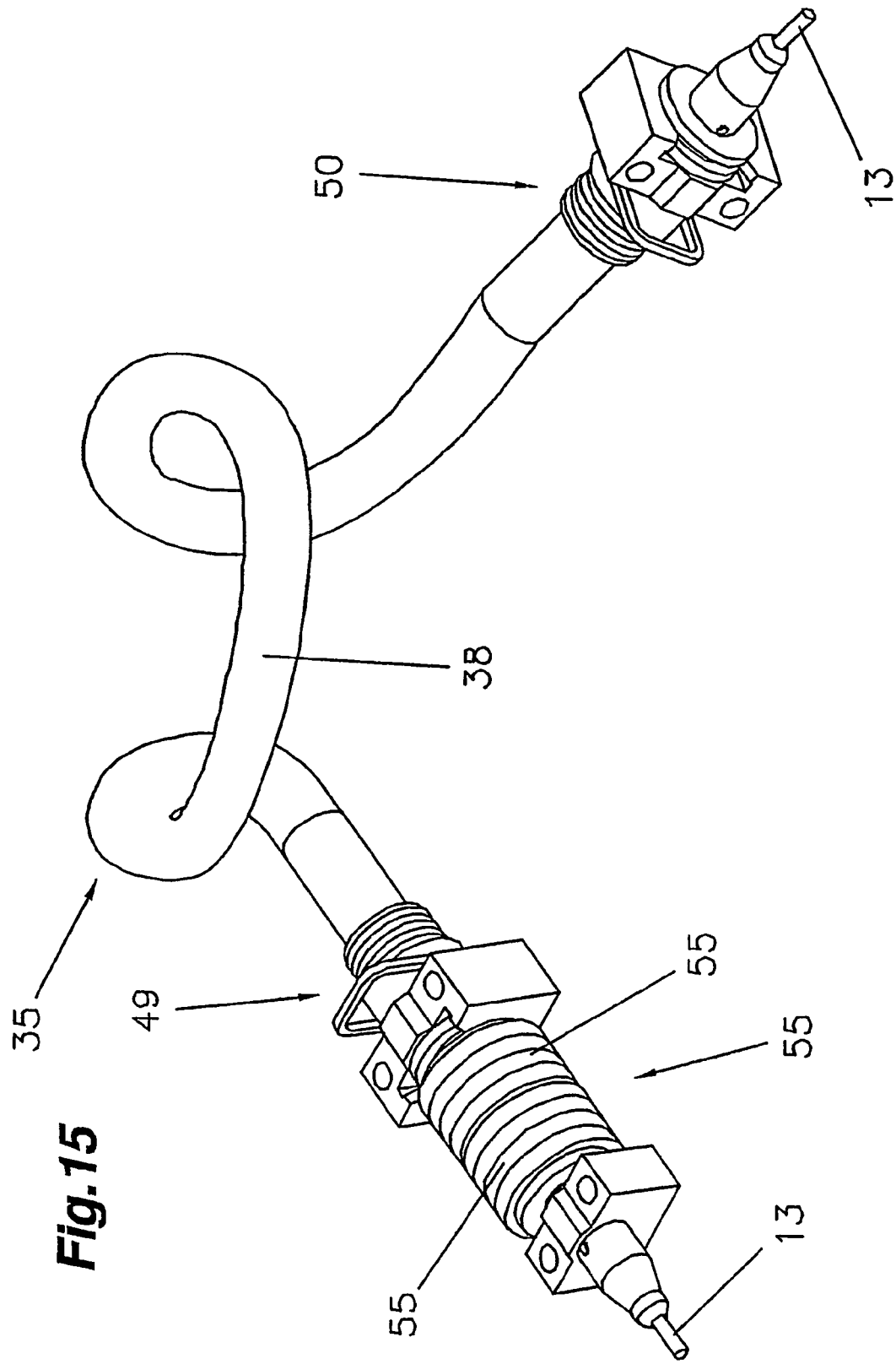
Figure 16:
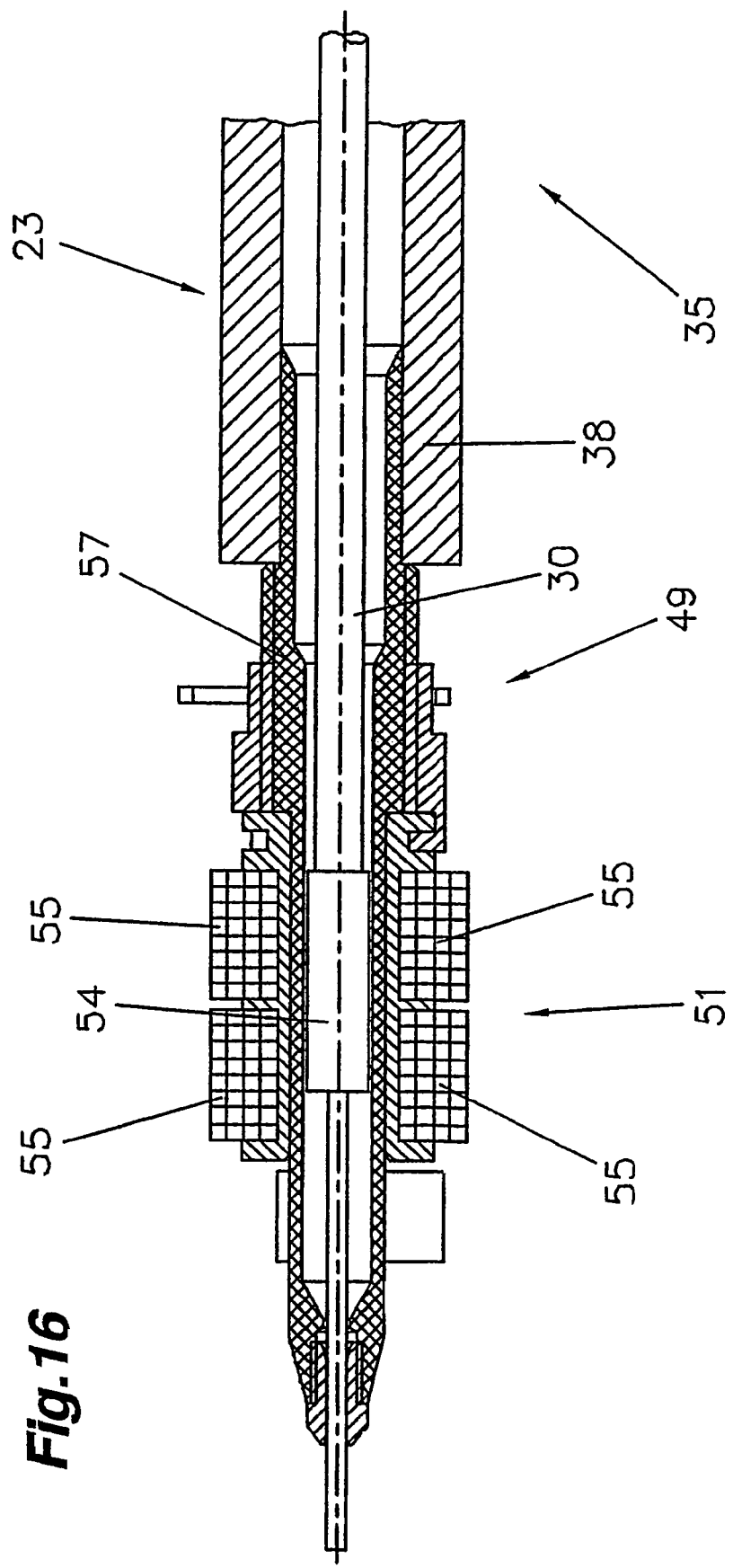

FIGS. 7 to 11 schematically illustrate differently configured welding plants;

FIG. 12 shows another variant embodiment for the formation of a wire buffer storage;

FIG. 13 is a diagrammatic view of a sensor for the detection of the wire core movement;

FIG. 14 depicts another exemplary embodiment of the sensor for the detection of the wire core movement;

FIG. 15 is a diagrammatic view of the wire buffer storage including a plug-in connection; and FIG. 16 is a schematic illustration of the plug-in connection.

FIG. 1 depicts a welding apparatus 1 or welding plant for various welding processes or methods such as, e.g., MIG/MAG welding or WIG/TIG welding, or electrode welding methods, double-wire/tandem welding methods, plasma or soldering methods etc.

The welding apparatus 1 comprises a power source 2 including a power element 3, a control device 4, and a switch member 5 associated with the power element 3 and the control device 4, respectively. The switch member 5 and the control device 4 are connected to a control valve 6 arranged in a feed line 7 for a gas 8 and, in particular, a protective gas such as, for instance, carbon dioxide, helium or argon and the like, between a gas reservoir 9 and a welding torch 10, or torch.

In addition, a wire feeder 11, which is usually employed in MIG/MAG welding, can also be activated by the control device 4, an additional material or welding wire 13 being fed from a feed drum 14, or wire roll, into the region of the welding torch 10 via a feed line 12. It is, of course, possible to integrate the wire feeder 11 in the welding apparatus 1 and, in particular, its basic housing as is known from the prior art, rather than designing the same as an accessory device as illustrated in FIG. 1.

It is also feasible for the wire feeder 11 to supply the welding wire 13, or additional material, outside the welding torch 10 to the process site, to which end a non-consumable electrode is preferably arranged within the welding torch 10, as is usually the case with WIG/TIG welding.

The power for building up an electric arc 15, particularly an electric arc for welding, between the consumable electrode and a workpiece 16 is supplied from the power element 3 of the power source 2 to the welding torch 10 and, in particular, electrode via a welding line 17, wherein the workpiece 16 to be welded, which is formed of several parts, is likewise connected with the welding apparatus 1 and, in particular, the power source 2 via a further welding line 18, thus enabling a power circuit for a process to build up over the electric arc 15 or plasma jet formed.

To provide cooling of the welding torch 10, the welding torch 10 may be connected with a fluid reservoir 21 and, in particular, a water reservoir 21 by a cooling circuit 19 via an interposed flow control 20, whereby the cooling circuit 19 and, in particular, a fluid pump used for the fluid contained in the water reservoir 21, is started as the welding torch 10 is put into operation, so as to effect cooling of the welding torch 10.

The welding apparatus 1 further comprises an input and/or output device 22, via which the different welding parameters, operating modes or welding programs of the welding apparatus 1 can be set and called, respectively. In doing so, the welding parameters, operating modes or welding programs set by the input and/or output device 22 are transmitted to the control device 4, which, in turn, will subsequently activate the individual components of the welding plant or welding apparatus 1, and predefine the respectively desired control values.

Furthermore, the welding torch 10 in the exemplary embodiment illustrated is connected with the welding apparatus 1 or welding plant via a hose package 23. The hose package 23 accommodates the individual lines from the welding apparatus 1 to the welding torch 10. The hose package 23 is connected with the welding torch 10 via a coupling device 24, whereas the individual lines arranged within the hose package 23 are connected with the individual contacts of the welding apparatus 1 via connection sockets or plug-in connections. In order to ensure an appropriate strain relief of the hose package 23, the hose package 23 is connected with a housing 26 and, in particular, the basic housing of the welding apparatus 1 via a strain relief means 25. It is, of course, possible to use the coupling device 24 also for the connection to the welding apparatus 1.

Basically, it is to be noted that not all of the aforementioned components need be used or employed in the various welding methods or welding apparatus 1, such as, e.g., WIG devices or MIG/MAG apparatus or plasma devices. It is, for instance, feasible to design the welding torch 10 as an air-cooled welding torch 10.

FIG. 2 schematically illustrates a partial section of a prior art hose package 23. There, the lines required for a welding process, for instance a power line or electrode cable 17, cooling ducts 28 for a liquid-cooled welding torch 10 and one or several control lines 29 are arranged in a protective jacket 27.

The welding wire 13 required for the welding process is transported from the welding apparatus 1, or a wire feeder 11, via the hose package 23 by being introduced into a wire core 30. Prior to the threading in of the welding wire 13, the wire core 30 is inserted into a wire guide hose 31 arranged within the hose package 23. The wire guide hose 31 has an inner diameter 32 which is only insignificantly larger than the outer diameter 33 of the wire core 30. This offers the advantage of the wire core 30 being precisely guided and readily exchangeable for different welding wire diameters. This is necessary, because in a welding plant different welding wires 13 having different diameters 34 are used, whereby the simple exchange of the wire core 30 renders feasible the use of any desired welding wire 13 with its respectively matching wire core 30, thus enabling the optimum adaptation of the wire core 30 to the diameter 34 of the welding wire 13. In doing so, the outer diameter 33 of the wire core 30 for the most different diameters 34 of the welding wires 13 remains approximately the same so as to ensure a guidance of the welding wire of the wire core 30 as largely play-free as possible.

FIGS. 3 to 12 depict exemplary embodiments for the formation of a buffer device for a welding wire 13, i.e., a wire buffer or wire buffer storage 35, the solution according to the invention, however, being not limited to the exemplary embodiments illustrated.

What is essential to the solution according to the invention is that the wire buffer storage 35 is arranged between a wire feeder 36 provided on the welding apparatus 1, or an external wire feeding means 11, and a further wire feeder 37 preferably positioned in the region of the welding torch 10, or within the welding torch 10 itself, the welding wire 13 being preferably conducted in the wire core 30 between the two wire feeders 36, 37. The wire buffer storage 35 is designed in a manner that the wire core 30 with the welding wire 13 is arranged, at least over a partial region, within a wire guide hose 38 having a substantially larger cross section 39 or inner diameter than a cross section or outer diameter 33 of the wire core 30, the storage volume of the wire buffer storage 35 being defined by the cross section 39 and the length of the substantially larger wire guide hose 38.

According to the prior art as represented in FIG. 2, the wire guide hose 31 is designed to be only negligibly larger than the outer diameter 33 of the wire core 30. By contrast, the inner diameter or cross section 39 of the wire guide hose 38 in the solution according to the invention, for instance according to FIG. 3, is larger, preferably at least 1.5 times larger, than the outer diameter 33 or cross section of the wire core 30. The wire core 30 is arranged to be freely movable within the wire guide hose 38. In addition, the wire guide hose 38 may extend within the hose package 23 in a helix-shaped or spiral-shaped manner, while the prior art wire guide hose 31 according to FIG. 2 extends substantially linearly through the hose package 23. It goes without saying that it is also feasible to arrange the substantially larger wire guide hose 38 likewise linearly in the hose package 23. The advantage of the helix-shaped or spiral-shaped extension of the wire guide hose 38, however, resides in that the wire core 30 is thereby slightly curved to facilitate the deformation of the wire core 30, for instance, in the manner of a spring.

It is also possible to arrange the wire guide hose 38 outside the hose package 23, as is schematically illustrated in FIG. 4. In that case, the wire guide hose 38 preferably extends again in a helix-shaped or spiral-shaped manner around the hose package 23. It is, moreover, possible to arrange the wire guide hose 38 independently of the hose package 23 so as to extend, for instance, helically or spirally about a carrier material or any desired line of the welding system, which is likewise arranged outside the hose package 23.

Due to the helix-shaped arrangement of the wire guide hose 38, it is ensured in an advantageous manner that the length of the wire guide hose 38 between the two ends of the hose package 23 may be extended relative to the other lines arranged within the hose package 23, thus providing a buffer volume defined by the cross section 39 of the wire guide hose 38, i.e., a buffer volume resulting from the difference in the lengths of the helical lines on the outer and inner diameters of the wire guide hose 38. The other lines usually arranged substantially linearly within the hose package 23 are preferably located within the helically or spirally extending wire guide hose 38. It is, of course, also possible that the other lines too extend helically within the hose package 23, i.e., that the wire guide hose 38 is twisted with the other lines, as one might say.

The functional principle of the buffer device according to the invention, i.e. of the wire buffer storage 35, is illustrated in FIGS. 5 and 6. There, the wire buffer storage 35 extends between two wire feeders 36, 37. The wire core 30 is fastened or fixed on one end, preferably in the region of the welding apparatus 1 or external wire feeding means 11, at which the welding wire 13 is introduced into the wire core 30 from the wire coil, whereas the other end of the wire core 30 is freely movable, preferably terminating in the region of the welding torch 10. The wire core 30 is, thus, freely movable within the wire guide hose 38. At the same time, the free end of the wire core 30 is able to carry out a longitudinal movement as a function of the state of curvature of the wire core 30 within the wire guide hose 38, i.e., as a function of the storage condition.

The preferably helix-shaped configuration of the wire guide hose 38 ensures that also the wire core 30 extends in a helix-shaped manner, thus providing defined radii 40 for the welding wire 13 and, hence, also for the wire core 30. By changing the radii 40, i.e. the position of the wire core 30 within the wire guide hose 38, the wire buffer storage 35 is being formed. In FIG. 5, the buffer device is schematically illustrated with its minimum storage volume, and in FIG. 6 the buffer device is schematically illustrated with its maximum storage volume. From this, it is apparent that the wire core 30, with the minimum storage volume, rests on an inner side 41 of the wire guide hose 38 while very large radii 40 are formed, whereas the wire core 30, with the maximum storage volume, comes to lie on an outer side 42 of the wire guide hose 38 while smaller radii 40 of the wire core 30 are formed. Furthermore, it is apparent that, due to the different storage conditions, a movement, particularly longitudinal movement, of the wire core 30 is carried out, as is indicated by a change in the length 43 of the free end of the wire core 30.

The configuration of a wire buffer storage 35 of this type enables the welding wire 13 and, in particular, the surplus length of the welding wire 13 to be collected in the wire buffer storage 35 by changing the radii 40 of the wire core 30 at different wire speeds or conveying directions rather than having to be pushed back over the entire hose package 13 as is known from the prior art. With the solution according to the invention, it may, thus, be basically stated that different storage volumes will be provided for the welding wire 13 as a function of the configuration of the wire guide hose 38, i.e., its length and cross section 39, which means that the wire buffer storage 35 is able to accommodate less or more surplus welding wire 13. This enables an adaptation of the required storage volume to be effected by changing the wire guide hose 38 or hose package 23, respectively.

In order to enable the optimum welding wire conveyance to be realized with a wire buffer storage 35 of this kind, means for detecting the filling level or storage condition of the wire buffer storage 35 are provided, said detection means detecting or determining the longitudinal movement of the wire core 30 and, hence, allowing the filling state of the wire buffer storage 35 to be concluded therefrom. This may, for instance, be effected in a simple manner by coupling the free end of the wire core 30 to a potentiometer 45 or incremental sensor via a driver arm 44 such that the filling level of the wire buffer storage 35 can be concluded from the longitudinal change 43 of the wire core 30 by a control device 4, as is schematically illustrated in FIGS. 5 and 6. It is, however, also possible to use other sensors for detecting the filling level, as will be described below by way of FIGS. 13 and 14.

The essential advantage of such a longitudinal design of the wire buffer storage 35 resides in that the wire buffer storage 35 is arranged directly behind the welding torch 10, thus causing hardly any additional friction losses during welding wire conveyance. Another advantage consists in that the wire buffer storage 35 is directly integrated in the hose package 23, or may be laid around the hose package 23, thus enabling existing plants to be equipped or subsequently provided with such a wire buffer storage 35. Nor will the handling for robot application be markedly affected by the longitudinal orientation of the buffer device.

The other schematically illustrated welding systems according to FIGS. 7 to 12 serve to elucidate the application of the buffer device, i.e., the wire buffer storage 35, in differently structured welding plants. The welding plants are merely represented schematically in the form of functional blocks.

Basically, it should be noted that the wire buffer storage 35, if provided, may also be inactively employed, i.e., with the function of the wire buffer storage 35 out of operation, without requiring any measures to be taken by the user. Thus, standard welding processes that do not require the storage of surplus welding wire 13 may be carried out as well. In such cases, the wire core 30, for instance at an exclusive forward conveyance of the welding wire 13, will adjust to a minimum or maximum state as a function of the control of the wire feeding means 36, 37 so as to allow the realization of a usual welding process.

FIG. 7 depicts a welding plant which comprises a welding apparatus 1 in which the feed drum 14 or wire coil and a first wire feeder 36 are arranged, a hose package 23 with an integrated wire buffer storage 35, a further wire feeder 37 and a welding torch 10. The wire feeder 36 arranged in the welding apparatus 1 pulls the welding wire 13 from the feed drum 14, conveying the same via the wire core 30 (not illustrated) to a further wire feeder 37, and from there to the welding process via the welding torch 10.

In this case, it is feasible that the first wire feeder 36, i.e. that housed within the welding apparatus, is operated as a so-called master drive (main drive) and the further wire feeder 37 serves as a so-called slave drive (auxiliary drive). The slave drive is operated at a slightly higher speed, thus keeping the welding wire 13 within the hose package 23 and, hence, within the wire buffer storage 35 under tensile stress, as is schematically indicated by a straight line. In this case of application, the storage volume of the wire buffer storage 35 is in a minimum position almost all the time, cf. FIG. 5, with the wire buffer storage 35 being inactive.

The advantage of such a control resides in the obtainment of a very simple control of the two wire feeding means 36, 37 because of the master drive being always operated at a constant speed. If, for instance, the speed of the slave drive is temporarily reduced, or slipping of the driving rollers occurs with the slave drive, the master drive need not be controlled in any manner whatsoever, since the short-term surplus of welding wire 13 conveyed by the master drive will be taken up by the wire buffer storage 35.

With the application according to FIG. 8, the wire feeder 36 arranged within the welding apparatus 1 is used as a slave drive and the wire feeder 37 arranged in the region of the welding torch 10 or directly in the welding torch 10 is used as a master drive. The slave drive, i.e., the wire feeder 36 provided in the welding apparatus 1, pulls the welding wire 13 from the feed drum 14, preferably in a torque-controlled manner. The master drive, i.e., the wire feeder 37 arranged in the region of the welding torch 10, at the same time works off the wave forming within the wire buffer storage 35, in a speed-controlled manner, which means that the wire buffer storage 35 is filled to its maximum almost all the time.

The advantage of such an application resides in that the change in the length of the welding wire 13 is compensated by the wire buffer storage 35 due to torsions of the hose package 23 (=Bowden pull effect).

FIG. 9 depicts a dynamic wire conveyance by which the welding wire 13 is available to the welding torch 10 in a force-free manner, i.e. with neither tensile nor compressive forces from the wire feeders 36 and 37 acting on the welding wire 13. In this case, the filling level of the wire buffer storage 35 is preferably kept neutral, i.e. controlled to a mean value ranging between the minimum and maximum states, which enables short-term fluctuations in wire conveyance to be absorbed by the wire buffer storage 35. That control allows forward-backward movements or different conveying speeds of the welding wire 13, since these will be taken up by the wire buffer storage 35.

To this end, the wire feeder 36 provided in the welding apparatus 1 is designed as a slave drive and the wire feeder 37 arranged in the region of the welding torch 10 is designed as a master drive. The slave drive pulls the welding wire 13 from the feed drum 14 and conducts the same forcelessly on into the hose package 23, i.e., into the wire buffer storage 35. The master drive performs a controlled movement, i.e., the two wire feeders 36 and 37 are controlled in a manner that the filling level of the wire buffer storage 35 will be kept at a balanced level, or they are constantly coordinated, which means that the two wire feeders 36, 37 are controlled in terms of their torque or speed.

Such a dynamically balanced welding wire conveyance enables the decoupling of the two wire feeders 36 and 37 and, hence, the realization of a true push-pull welding wire conveyance (forward/backward conveyance), i.e., the upstream wire feeder 36, i.e. in this case the master drive, carries out a forward/backward conveyance of the welding wire 13, thus forming a pulsating welding wire movement. Such an application of a push-pull welding wire conveyance has now become feasible in practice for the first time on account of the specially designed wire buffer storage 35, since the welding wire 13 need not be pushed back through the entire wire core 30, i.e., the entire hose package 23, as is known from the prior art, which entails very high friction losses and a very high inertia, but the surplus welding wire 13 is pushed into the wire buffer storage 35 immediately behind the welding torch 10, thus enabling a very rapid reversal of the conveying direction. The clock-pulse period for the push-pull drive may, thus, be substantially increased. This also occurs during a welding wire conveyance at different conveying speeds.

Due to the special arrangement of the wire buffer storage 35 immediately behind the welding torch 10, no or only slight friction losses will occur at a backward movement of the welding wire 13 through the wire feeder 37, whereby the reaction behavior will be substantially enhanced at a reversal of the direction of rotation so as to enable very rapid switching with a low-performance wire feeder 37.

From the welding plant of FIG. 10, an application with a wire buffer storage 46 known from the prior art, which is arranged within the welding apparatus 1, and the wire buffer storage 35 according to the invention provided in the hose package 23 is shown. In this case, the first wire buffer storage 46 is formed in a manner that the welding wire 13 runs around the feed drum 14 or wire roll in a loop-like manner and is pulled from the feed drum 14 by a first wire feeder 47. After this, the welding wire 13 is conveyed from the wire buffer storage 46 provided in the welding apparatus 1 by a further wire feeder 36 arranged in the welding apparatus 1 into the hose package 23 and, hence, into the longitudinally designed wire buffer storage 35, from where it is supplied to the welding torch 10 via the wire feeder 37 arranged in the region of the welding torch 10.

By this construction, it is achieved that the welding wire 13 is forcelessly conveyed into the hose package 23. In doing so, the slack of the wire roller or feed drum 14 during the pulling-off of the welding wire 13 from the same does not affect the wire feeder 36 for introducing the welding wire 13 into the hose package 23. In this case, the third wire feeder 47 may also be omitted by the welding wire 13 being directly conveyed into the hose package 23 by the wire feeder 36.

Another exemplary application is illustrated in FIG. 11, in which several hose packages 23 are coupled to one another with a wire feeder 47 being, for instance, interposed. In this case, it is feasible to arrange the wire buffer storage 35 according to the invention in only one of the hose packages 23, namely that arranged closest to the welding torch 10.

It goes without saying that the wire buffer storage 35 may not only be comprised of a wire guide hose 38 as described above. Thus, it is, for instance, possible to replace the wire guide hose 38 with a channel 48 of any desired cross-sectional shape such as, for instance, a rectangular, triangular, oval shape etc., extending, for instance, in a helix-like manner. Such an example is apparent from FIG. 12. The channel 48 may be arranged independently of the hose package 23 or even within the hose package 23. It is also feasible to use several channels 48 or wire guide hoses 38 so as to provide a multi-wire welding plant.

It is also feasible to make such a wire buffer storage 35 without any wire core 30, or design the wire core 30 in a manner to provide an appropriate free space of movement to the welding wire 13 within the same, which means that the bore for the welding wire 13 is by 1.5 times larger than the outer diameter 33 of the welding wire 13. However, such a construction involves the disadvantage that the monitoring of the filling level of the wire buffer storage is extremely difficult to realize.

FIGS. 13 and 14 depict a special exemplary embodiment for the detection of the longitudinal movement of the wire core 30 in a partially sectioned view, with only the most essential elements having been illustrated for the sake of clarity. In these embodiments, the means for detecting the longitudinal movement of the wire core 30 includes a sensor 51 which performs a contactless measurement of the longitudinal movement of the wire core 30.

FIG. 13 is a diagrammatic illustration of the sensor 51 with its associated wire feeder 37 and inserted wire core 30 that ends within the sensor 51, while the wire core 30 of FIG. 14 extends through the sensor 51.

The sensor 51 comprises a housing 52, with the wire core 30 extending directly into the housing 52 and an evaluation element 53 being arranged within the housing 52. The structural size of the sensor 51 is such that the sensor 51 can be arranged within the welding torch 10 or within the hose package 23, the sensor 51 being preferably arranged within the welding torch 10 and, in particular, torch handle.

Furthermore, an indicator 54 is arranged on the wire core 30 in a manner rigidly connected with the wire core 30 in this embodiment. The indicator 54 is, for instance, made of a ferromagnetic material and constitutes the termination of the wire core 30, the wire core 30 ending in the sensor 51 with the terminating indicator 54. In order to enable the contactless detection of the longitudinal movement of the wire core 30, the evaluation element 53 is preferably comprised of at least one electric coil 55. With the sensor 51 designed in this manner, the measurement of the position, i.e. the longitudinal displacement of the wire core 30, is effected through an induction change within the coil 55, i.e., by the inductance changing within the coils 55 due to the displacement of the indicator 54, so as to enable the determination or calculation of the position by an in-circuit evaluation unit or control device 4.

The sensor 51 further comprises a runout pipe 56 for the welding wire 13, whose opening has a diameter that is only negligibly larger than the diameter of the welding wire 13. It is thereby ensured that the wire core 30 cannot emerge through the runout pipe 56. In a preferred manner, the runout pipe 56 is connected with the housing 52 via a thread so as to be readily and rapidly exchangeable, thus enabling the adaptation of the runout pipe 56 to the respective diameter of the welding wire 13 employed.

The longitudinal movement of the wire core 30 is detected by the sensor 51, based on the measuring principle of an induction change of the coil 55. That measuring principle has already been known from the prior art and need not be discussed in detail. The sensor 51 may, of course, operate according to any other measuring principle, being, for instance, comprised of a capacitive or optical sensor. The sensor 51 may, of course, be used for any other purposes which require the detection of a longitudinal movement of the wire core 30.

The sensor 51 is connected with an evaluation unit or control device 4 of the welding apparatus 1 via lines (not illustrated) in a manner that the evaluation unit or control device 4 will detect or calculate the filling level of the wire buffer storage 35 as a function of the position of the wire core 30 or indicator 54, respectively, within the housing 52.

FIG. 14 depicts another exemplary embodiment for the configuration of the sensor 51. As in contrast to the previously described exemplary embodiment, the wire core 30 in this case is conducted through the housing 52 of the sensor 51. The indicator 54 is again fastened to the wire core 30 and is positioned so as to be located within the housing 52. This configuration offers the advantage that the sensor 51 need no longer be arranged only on the end of the wire core 30, but may be positioned at any desired point within the wire conveying system. The use of the sensor 51 is, thus, feasible with any wire buffer storage 35 known from the prior art.

By using a sensor 51 of this type, it has now become feasible that the wire feeders 36, 37 are activated by the control device 4 of the welding apparatus 1 as a function of the filling level with a view to controlling the filling level of the wire buffer storage 35.

FIGS. 15 and 16 depict a further exemplary embodiment of the structure of a wire buffer storage 35, in which the wire buffer storage 35 is arranged outside the hose package 23. In this case, the wire guide hose 38 is laid around the hose package 23 as already schematically illustrated in FIG. 4, the hose package 23 having been omitted for the sake of clarity.

This exemplary embodiment is to elucidate the easy exchangeability of the wire buffer storage 35 without requiring any special retrofitting or adaptation work from the user.

To this end, a terminal element and, in particular, a quick-lock 49, 50 is arranged on either end of the wire guide hose 38 to enable the connection of the latter with a central connection (not illustrated). The central connection may be configured in accordance with the application WO 02/090034 A1, so that the structure of the central connection need not be discussed in any more detail. The quick-lock 49, 50 is, for instance, designed as a bayonet catch with the wire guide hose 38 being, for instance, clamped onto the same in a simple manner.

The wire guide hose 38 with the connected quick-locks 49, 50 is designed in a manner that the inserted wire core 30 (not illustrated) for the welding wire 13 terminates within that unit comprised of a wire guide hose 38 and a quick-lock 49, 50. This enables the wire buffer storage 35 to be made of a structural unit comprised of wire guide hose 38 with the attached quick-locks 49, 50 and the wire core 30, which unit can be mounted or exchanged in a single operating step by simply connecting the quick-lock 49, 50 with the central connection and subsequently winding the same around the hose package 23.

The quick-lock 49 on the side of the welding torch 10 is designed in a manner that a guide element 57 projects through the central connection, said guide element 57 terminating directly in the sensor 51 so as to enable the use of the sensor 51 according to FIG. 13. As in contrast to FIG. 13, the sensor 51 in this case, however, not only receives the wire core 30, but is designed to be able to receive the guide element 57 of the quick-lock 49. The function for measuring the position of the wire core 30 according to FIG. 13 is, however, maintained because of the wire core 30 being arranged within the guide element 57 together with the indicator 54, and a change in the induction of the coil 55 will, hence, take place again. The guide element 57 is preferably made of a nonmagnetic material such as, for instance, brass.

At the further quick-lock 50, which is applied in the region of the welding apparatus 1 or the external wire feeding means 11, another guide element is arranged, however, whose function now is to fasten the wire core 30 to the quick lock 50, the illustration of its structure having been omitted. To this end, a clamping connection is realized or inserted in a simple manner by fixing the wire core 30 within the guide element by turning on a male nut. In doing so, the wire core 30 is able to project out of the guide element such that the wire core 30 will reach into the welding apparatus 1 or external wire feeding means 11 upon fastening of the quick-lock.

It is, thus, advantageous that, by providing said single unit comprised of the wire guide hose 38, the quick-locks 49, 50 and the wire core 30 with the indicator 54, a very rapid mounting and exchange of said unit is feasible without requiring additional operating steps, by simply connecting the quick-locks with the central unit. In order to ensure the wire guide hose 38 to be helically or spirally laid by the user, a predeformation of the wire guide hose 38 is effected at the manufacture and supply of said unit, which means that the wire guide hose 38 already has its helix-shaped or spiral-shaped form before being mounted to the hose package 23 such that the user will only need to wind the wire guide hose 38 around the hose package 23 according to the pregiven windings of the same. It is, thus, feasible to readily exchange the wire buffer storage 35 without any tool or auxiliary means.

It is, furthermore, feasible with longer hose packages 23 that the wire guide hose 38 need not extend over the whole region by its larger cross section but that only a subportion of the wire guide hose 38 has such a large cross section 39 according to the required buffer volume, with the remaining course being designed according to the prior art.

The invention claimed is:

1. A buffer device for a welding wire, comprising: a wire buffer storage arranged between a wire feeder provided on a welding apparatus, or an external wire feeding means, and a further wire feeder arranged adjacent a welding torch or within the welding torch, the wire buffer storage comprising a wire core and wire hose surrounding the wire core, wherein the welding wire is conducted between the two wire feeders within the wire core, wherein the wire buffer storage (35) is designed in a manner that the wire core (30) is fastened or fixed on one end, with its other end being freely movable, wherein the wire core (30) together with the welding wire (13), at least over a partial region, is arranged to be freely movable within the wire guide hose (38), said wire guide hose extending in a helix-shaped or spiral-shaped manner and having a substantially larger cross section (39) or inner diameter than the cross section or outer diameter (33) of the wire core (30) so that during backward conveyance of the welding wire, the welding wire together with the wire core is pushed backward into the wire guide hose and stored there without displacing the welding wire within the wire core, wherein the storage volume of the wire buffer storage (35) is defined by the cross section (39) and length of the substantially larger wire guide hose (38), and wherein means for detecting the filling level or quantity of welding wire (13) of the wire buffer storage (35) are arranged, said detection means detecting the longitudinal movement of the wire core (30) and, in particular, the free end of the wire core (30).

2. A buffer device according to claim 1, wherein the wire core (30) is fastened or fixed in the region of the welding apparatus (1) or external wire feeding means (11).

3. A buffer device according to claim 1, wherein the inner diameter or cross section (39) of the wire guide hose (38) is at least 1.5 times larger than an outer diameter (33) of the wire core (30).

4. A buffer device according to claim 1, wherein the wire guide hose (38) is arranged within a hose package (23).

5. A buffer device according to claim 1, wherein the wire guide hose (38) extends within said hose package (23).

6. A buffer device according to claim 5, wherein lines are arranged within the hose package (23) in addition to the wire guide hose (38), said lines being arranged within the helically or spirally extending wire guide hose (38).

7. A buffer device according to claim 1, wherein the wire guide hose (38) is arranged outside a hose package (23).

8. A buffer device according to claim 7, wherein the wire guide hose (38) is arranged around the hose package (23).

9. A buffer device according to claim 7, wherein the wire guide hose (38) is arranged to extend about a carrier material independently of the hose package (23).

10. A buffer device according to claim 1, wherein the wire buffer storage (35) is comprised of a structural unit comprising the wire guide hose (38), on which a terminal element, particularly a quick lock (49, 50) is arranged on either end, and the wire core (30).

11. A buffer device according to claim 10, wherein a guide element (57) of the terminal element, particularly quick lock (49, 50), projects into a sensor (51) for detecting the longitudinal movement of the wire core (30).

12. A buffer device according to claim 1, wherein the wire buffer storage (35) is exchangeable without requiring any tool.

13. A buffer device according to claim 1, wherein the wire guide hose (38) is preformed in a helix-shaped or spiral-shaped manner.

14. A welding plant comprising a welding apparatus, a hose package and a welding torch, wherein the hose package connects the welding torch with the welding apparatus, and a device designed as a wire buffer storage and arranged between two wire feeders, wherein said wire buffer storage (35) is formed in or around the hose package (23);

wherein the wire buffer storage (35) comprises a wire core and a wire guide hose, wherein the wire buffer storage is designed in a manner that the wire core (30) is fastened or fixed on one end, with its other end being freely movable, wherein the wire core (30) together with the welding wire (13), at least over a partial region, is arranged to be freely movable within the wire guide hose (38), said wire guide hose extending in a helix-shaped or spiral-shaped manner and having a substantially larger cross section (39) or inner diameter than the cross section or outer diameter (33) of the wire core (30) so that during backward conveyance of the welding wire, the welding wire together with the wire core is pushed backward into the wire guide hose and stored there without displacing the welding wire within the wire core, wherein the storage volume of the wire buffer storage (35) is defined by the cross section (39) and length of the substantially larger wire guide hose (38), and wherein means for detecting the filling level or quantity of welding wire (13) of the wire buffer storage (35) are arranged, said detection means detecting the longitudinal movement of the wire core (30) and, in particular, the free end of the wire core (30).

15. A device according to claim 1, further comprising a welding plant including a welding apparatus, a hose package, a welding torch, wherein the hose package connects the welding torch with the welding apparatus, and wherein said device is formed in or around the hose package.

* * * * *